Patented July 17, 1951

2,560,611

UNITED STATES PATENT OFFICE 2,560,611

DRILLING FLUIDS AND METHODS OF USING SAME

Cary R. Wagner, Utica, Ohio, and William N. Axe and Chester M. Himel, Bartlesville, Okla., assignors to Phillips Petroleum Company, a corporation of Delaware No Drawing. Application March 15, 1948, Serial No. 15,053. In the Netherlands December 18, 1947

24 Claims. (Cl. 252—8.5)

The invention relates to drilling fluids. In one of its more specific aspects, it relates to a drilling fluid comprising solutions (and by "solutions" we mean to include dispersions and suspensions) of cellulose which are not precipitated or regenerated in any substantial degree by dilution with water and/or the usual dilute salt containing connate water of an oil well formation or by the heat or cold generally obtainable in a well. In another aspect, it relates to a drilling fluid comprising a cellulose acid sulfate and its metal and ammonium salts, and to the methods and use of such celluloses for controlling viscosity, gel strength, water loss and filter cake thickness of oil well drilling fluids.

This application is a continuation-in-part of our copending application Serial No. 626,895, filed November 5, 1945, now abandoned, for "Drilling Fluids and Methods of Using Same."

In the art of drilling wells, especially drilling wells by the rotary method, it is necessary to use a drilling mud or drilling fluid, as is well understood in the art. The drilling mud lubricates the drill stem, carries the cuttings to the surface of the well, cools the drill bit and forms a filter cake on the walls of the well preventing loss of at least any substantial amount of water from the drilling mud to the natural formation of the well. In order to perform these important functions properly, the drilling mud must have suitable viscosity and other properties at all times.

The principal object of our invention is to provide a drilling mud which can be used in substantially all formations with reduced water loss, thin filter cake, and proper viscosity and gel strength.

Another object is to provide an improved drilling fluid.

Another object is to provide an improved method of drilling.

Another object is to provide drilling mud additives suitable for providing proper viscosity, gel strength, water loss and filter cake thickness of well drilling fluids.

Another object is to provide a drilling mud containing a water soluble (including by "soluble" dispersible and suspendible) cellulose acid sulfate or salt thereof which is not precipitated or regenerated in any substantial degree by dilution by water and/or connate water, such as a suitable cellulose acid sulfate and its metal and ammonium salts.

Numerous other objects and advantages of this invention will be apparent to those skilled in the art upon reading the accompanying specification and claims.

In the present invention, to obtain these objects, we prefer to employ in the drilling mud, cellulose such as a water soluble acid, metal, or ammonium cellulose sulfate. The term cellulose acid sulfate and its salts includes all water soluble cellulose compounds which may be regarded structurally as being the cellulose monoesters of sulfuric acid and the metal and ammonium salts thereof. The cellulose acid sulfate esters are characterized by the typical sulfate linkage:

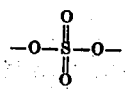

wherein S is sulfur, and O is oxygen.

It will be seen that the reaction product of cellulose and sulfuric acid or chlorosulfonic acid contains the sulfate linkage:

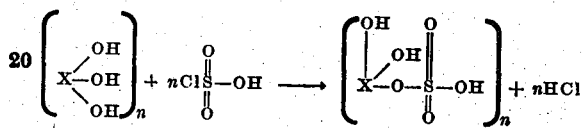

wherein

is an anhydroglucose unit of the cellulose molecule and $n$ is the number of such units in such cellulose molecule.

Such a cellulose is not precipitated or regenerated by dilution of water and/or the usual salt containing connate water. Nor is it precipitated by heat or cold generally obtainable in a well, or regenerated during use as a drilling fluid by aging or ripening, as it is substantially stable substance for a long period of time. Substances which precipitate or regenerate under the above conditions, we find, are not suitable for use in drilling mud, although they may find some use as plugging agents for plugging wells, and therefore, are not related to the present invention. Such plugging agents would soon precipitate and fill the mud pit and also choke the drill stem in the hole.

The amount of said water soluble cellulose employed can be varied over a rather broad range as even small amounts give a corresponding smaller effect.

The cellulose acid sulfate mentioned above may be prepared by any methods known to the art.

The number of sulfate groups introduced into the cellulose is variable, depending on reaction conditions, and may be varied to change the properties of the product to a minor degree. Only one such group is indicated in the formula shown.

The methods of preparing cellulose acid sulfates developed by others are suitable to produce the same for use in the present invention.

One method for the preparation of cellulose acid sulfate is by the use of a compound containing a suitable reactive free acid radical in the presence of pyridine. When such compound is employed, pyridinium salts of the cellulose sulfate reaction product may be formed. For example, acid esters of cellulose and sulfuric acid can be prepared by treating cellulose with chlorosulfonic acid in the presence of sufficient pyridine to more than salify all of the HCl formed in the reaction. The crude reaction product comprising the pyridinium salt of the cellulose sulfate along with pyridine hydrochloride forms a clear, viscous, colloidal solution in water. The pyridinium salt may be represented as follows:

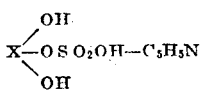

where X represents the cellulose residue.

Another suitable method for the preparation of a cellulose acid sulfate is the reaction between cellulose and sodium chlorosulfonate in the presence of pyridine. Pyridine reacts with hydrogen chloride formed to maintain a low acidity in the reaction mixture.

The above pyridinium salt of cellulose acid sulfate may be isolated as a white hygroscopic solid. This material is dispersible in water and can be valuably employed in the treatment of drilling muds.

If the pyridinium salt of the cellulose acid sulfate were used in alkaline drilling muds, the complex would hydrolize and the pyridine would be lost. In order to avoid this consumption of the expensive pyridine, the complex is treated with aqueous alkali, yielding the sodium salt of the cellulose acid sulfate and pyridine. The pyridine may be recovered and recycled to the primary reaction zone. The cellulose acid sulfates thus prepared have from 2.5 to 2.8 sulfuric acid radicals per C6 unit in the cellulose molecule. As in the case of the pyridinium salts, the sodium salts of cellulose acid sulfate give aqueous colloidal solutions of relatively high viscosity. The other metals mentioned above and ammonia give respective salts also of some value, even though the barium salt, for example, is only slightly soluble in water.

The average number of sulfate groups per anhydroglucose unit of the cellulose molecule is expressed as the degree of substitution. The degree of substitution may vary from 3 down to whatever degree is necessary to make the cellulose acid sulfate or its salts water soluble.

The metal salts of cellulose acid sulfate may be prepared by the reaction between a cellulose acid sulfate and a salt of the metal desired. They may also be prepared by adding an electrolyte to a solution of a cellulose sulfate salt which is more highly ionized than the cellulose sulfate salt of the electrolyte added. Other obvious methods of preparation may be employed.

Water soluble cellulose acid sulfate and water soluble salts of cellulose acid sulfate of this invention are not to be confused with water soluble cellulose sulfate whose use in drilling muds is disclosed and claimed in copending coassigned patent application Serial No. 634,153, filed December 10, 1945 by Cary R. Wagner and Martin A. Ryan.

The latter material, cellulose sulfate, has both of the indicated valences of the radical

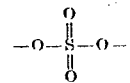

satisfied by anhydroglucose unit residues of cellulose, does not ionize, and does not form salts. It is prepared for example by reaction of an alkali cellulose with sulfuryl chloride in the presence of an inert diluent. On the other hand, water soluble cellulose acid sulfate of the invention of the present application contains the radical

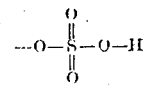

attached to an anhydroglucose unit residue of cellulose, and salts thereof replace the H of said radical by a cation, e. g. sodium. Such salt is designated as sodium cellulose sulfate. Cellulose acid sulfate and its salts are ionizable. Cellulose acid sulfate is prepared for example by reaction of cellulose with chlorosulfonic acid as indicated hereinabove.

Any use of a cellulose acid sulfate and derivatives described herein to be retained in the mud throughout the entire normal life of the drilling mud is not to be confused with the use of some cellulose which is to be precipitated as an insoluble plugging agent in the formation. Nor is the use of a cellulose which is substantially stable to heat or cold or aging or ripening or dilution by water or dilute salts of connate waters to be confused with plugging agents which are deliberately precipitated by such heat, or cold or dilution. We do not use our cellulose as a plugging agent at all, and while minor reactions in the well may form a colloidal haze of supposedly insoluble cellulose and while this colloidal solution may contact the formation, such minor traces of insoluble colloidal material is not comparable to the immediate precipitation of relatively massive insoluble plugging material. Drilling muds containing the cellulose acid sulfate or its salts of this invention are not subject to any injury by dilute salts to any detrimental degree in the amount used (which may be about 4 pounds of cellulose acid sulfate material per barrel of mud) and in the concentration of salt of usual connate waters.

Such drilling muds containing water soluble cellulose acid sulfate or its salts described herein often have low initial gel strength, which allows gas bubbles to come out of the drilling mud so rapidly that the drilling mud will not become gas cut. Elimination of gas cutting reduces the chances of blowouts. Such drilling muds containing cellulose acid sulfate or its salts are often characterized by a relatively thin filter cake and by small water loss. This is very useful in avoiding loss of water to the formation, as well as the resultant swelling or caving of the formation which occurs with some formations. They do not generally ferment or spoil.

A suitable mud for drilling may comprise, in combination, any finely divided suspended material in sufficient quantity to form a filter cake on the wall of the well, clayey materials, such as kaolin and/or bentonitic materials being preferred as such suspended material, sufficient water to maintain the mixture fluid, and enough of a water soluble cellulose acid sulfate compound to reduce the water loss without increasing the viscosity to such an extent that the mud cannot be circulated.

Numerous other advantages of water soluble cellulose acid sulfate drilling muds will be apparent from a study of the following representative tests which have been selected to show in a minimum of space the advantages of such muds.

TESTS

The tests of the properties of solutions of these water soluble cellulose acid sulfate drilling muds were all made with standard drilling mud laboratory equipment.

The measurements of pH were all made with a Beckman "Industrial Model M" pH meter. The viscosity measurements were all made with a Stormer viscosimeter 1931 model made by Arthur H. Thomas Company. The mixing of samples was always for 15 minutes with a Hamilton Beach No. 33 high speed mixer. Sodium chloride content was calculated from a determination of the chlorine ions by titration with silver nitrate, using a potassium chromate indicator. The filter cake thickness and water losses were all determined with an "A. P. I. low pressure wall building tester filter press" with a pressure of 100 lbs. per square inch applied for 30 minutes. All temperatures were approximately room temperature. All barrels are 42 U. S. gallon barrels.

EXAMPLE I

A sodium cellulose sulfate salt, having a degree of substitution equal to about 2.3, was tested in various mud systems. Varying amounts of the salt were added to the indicated muds and the tests run according to the method described in the preceding paragraph. The results were as shown in the following tables:

*Table 1.—High calcium mud (calcium=2200 P. P. M.)*

| Lbs. salt/bbl. mud | 0 | 1 | 2 | 4 |
|---|---|---|---|---|
| Viscosity, cps | 13 | 6 | 6.5 | 21 |
| Initial gel, gms | 20 | 5 | 1 | 1 |
| 10 min. gel, gms | 25 | 8 | 13 | 15 |
| 30 min. water loss | 51 | 43 | 21 | 6 |
| pH of filtrate | 7.9 | 7.5 | 7.7 | 7.9 |

*Table 2.—Low calcium mud (calcium=17 P. P. M.)*

| Lbs. salt/bbl. mud | 0 | 1 | 2 | 4 |
|---|---|---|---|---|
| Viscosity, cps | 19.5 | 28.5 | 39 | 77 |
| Initial gel, gms | 29 | 4 | 5 | 10 |
| 10 min. gel, gms | 60 | 25 | 30 | 30 |
| 30 min. water loss | 28.5 | 10 | 7 | 5 |
| pH of filtrate | 8.9 | 8.8 | 8.9 | 9.3 |

*Table 3.—Low calcium, high NaCl (Cl$_2$=97,000 P. P. M.)*

| Lbs. salt/bbl. mud | 0 | 1 | 2 | 4 |
|---|---|---|---|---|
| Viscosity, cps | 32 | 26 | 28 | 42.5 |
| Initial gel, gms | 55 | 35 | 40 | 45 |
| 10 min. gel, gms | 65 | 45 | 75 | 70 |
| 30 min. water loss | 58 | 52 | 36 | 11 |
| pH of filtrate | 7.8 | 8.0 | 7.1 | 7.3 |

EXAMPLE II

To test the stability of cellulose-sulfate-salt-containing muds to heat, samples of low calcium and high calcium muds containing 4 pounds of sodium cellulose sulfate per barrel of mud were tested before and after heating for 16 hours at 95° C. The results are shown in Tables 4 and 5 in comparison with blanks treated in a like manner.

*Table 4.—High calcium mud*

| | Before Heating | | After Heating | |
|---|---|---|---|---|
| Lbs. salt/bbl. mud | 0 | 4 | 0 | 4 |
| Viscosity, cps | 13 | 21 | 10.5 | 11 |
| Initial gel, gms | 20 | 1 | 15 | 3 |
| 10 min. gel, gms | 25 | 15 | 28 | 10 |
| 30 min. water loss | 51 | 6 | 55 | 12 |
| pH of filtrate | 8.9 | 8.7 | 9.2 | 8.9 |

*Table 5.—Low calcium mud*

| | Before Heating | | After Heating | |
|---|---|---|---|---|
| Lbs. salt/bbl. mud | 0 | 4 | 0 | 4 |
| Viscosity, cps | 19 | 77 | 20 | 89 |
| Initial gel, gms | 29 | 10 | 30 | 15 |
| 10 min. gel, gms | 60 | 30 | 55 | 45 |
| 30 min. water loss | 28 | 5 | 32 | 5 |
| pH of filtrate | 8.9 | 9.2 | 8.7 | 8.9 |

EXAMPLE III

Tests were made with the potassium salt of cellulose acid sulfate in combination with high and low calcium muds. The results were as follows in Tables 6 and 7.

*Table 6.—High calcium mud*

| Lbs. salt/bbl. mud | 0 | 1 | 2 | 3 | 4 |
|---|---|---|---|---|---|
| Viscosity, cps | 16 | 14.5 | 22.5 | 33 | 47.5 |
| Initial gel, gms | 29 | 0 | 0 | 2 | 1 |
| 10 min. gel, gms | 55 | 15 | 10 | 10 | 10 |
| 30 min. water loss | 30 | 10.5 | 8.5 | 5.5 | 5 |
| pH of filtrate | 9.3 | 9.0 | 8.6 | 9.3 | 9.3 |

*Table 7.—Low calcium mud*

| Lbs. salt/bbl. mud | 0 | 1 | 2 | 3 | 4 |
|---|---|---|---|---|---|
| Viscosity, cps | 20 | 7.5 | 10 | 18 | 22 |
| Initial gel, gms | 30 | 1 | 0 | 0 | 1 |
| 10 min. gel, gms | 50 | 20 | 5 | 5 | 5 |
| 30 min. water loss | 50 | 31 | 17 | 7 | 4 |
| pH of filtrate | 8.1 | 7.4 | 7.4 | 7.4 | 7.1 |

EXAMPLE IV

The barium, calcium, magnesium and ammonium salts of cellulose acid sulfate were tested in combination with a low calcium mud. The sample containing the ammonium salt was tested before and after heating for 2 hours at 98° C. The results as shown in Table 8.

*Table 8.—Cellulose sulfate salt used*

| | #/bbl. | Ba | Ca | Mg | NH$_4$ (before) | NH$_4$ (after) |
|---|---|---|---|---|---|---|
| Viscosity, cps | 0 | 17 | 17 | 17 | 17 | 18 |
| | 1 | 10 | 9.5 | 15 | 15 | 16.5 |
| | 2 | 15.5 | 14.5 | 24 | 24 | 21.5 |
| | 3 | 19.5 | 16.5 | 34.5 | 30 | 36 |
| | 4 | 27 | 21 | 41 | 37.5 | 42 |
| Initial gel, gms | 0 | 25 | 25 | 25 | 25 | 25 |
| | 1 | 0 | 0 | 0 | 2 | 2 |
| | 2 | 0 | 0 | 0 | 0 | 2 |
| | 3 | 1 | 0 | 2 | 0 | 0 |
| | 4 | 1 | 0 | 0 | 0 | 0 |
| 10 min. gel, gms | 0 | 50 | 50 | 50 | 50 | 50 |
| | 1 | 10 | 10 | 7 | 15 | 20 |
| | 2 | 2 | 5 | 5 | 20 | 20 |
| | 3 | 5 | 8 | 5 | 15 | 20 |
| | 4 | 4 | 5 | 12 | 10 | 20 |
| 30 min. water loss at 100 p. s. i. | 0 | 34 | 34 | 34 | 34 | 33 |
| | 1 | 12 | 13 | 11 | 11 | 13.5 |
| | 2 | 7.5 | 8 | 7.5 | 8 | 8.5 |
| | 3 | 5.5 | 6.5 | 5.5 | 6.7 | 7 |
| | 4 | 4 | 5 | 5 | 5 | 5.5 |
| pH of filtrate | 0 | 9.3 | 9.3 | 9.3 | 9.3 | 9.0 |
| | 1 | 8.9 | 8.5 | 9.0 | 9.0 | 9.0 |
| | 2 | 8.6 | 8.6 | 9.1 | 9.0 | 9.0 |
| | 3 | 8.8 | 8.6 | 8.8 | 9.0 | 8.9 |
| | 4 | 8.0 | 8.6 | 8.8 | 8.8 | 8.8 |

EXAMPLE V

A water loss test was run on a one per cent water solution (equivalent to 3.5 pounds per barrel) of sodium cellulose sulfate. At 100 p. s. i. g., the water loss was 200 milliliters in 10 seconds.

EXAMPLE VI

Numerous other tests have been omitted because believed unnecessary and to prevent the specification from being prolix. However, tests of aluminum, zinc, cobalt, manganese, nickel, silver, cadmium, copper, iron, lead, tin, and mercury cellulose sulfates show that all metal cellulose sulfates are of value as water base drilling mud additives for reducing water loss as are the metal cellulose sulfates listed above with full data on the same, such as sodium cellulose sulfate.

The substances mentioned herein are from the class of cellulose esters and we have found that in the practice of the present invention, a stable aqueous well drilling fluid which is substantially non-precipitating and non-regenerating under usual well conditions can be made with such water soluble stable cellulose esters. Because they are water soluble they will not precipitate upon dilution as may occur in the well.

It is understood that while a theory of operation has been advanced, it is not the only or necessary one, but has been advanced only to facilitate the disclosure. It is understood, however, that this invention is not limited to any theory of operation or action. It is further obvious that various changes may be made in the details without departing from the spirit of this invention, or from the scope of the invention as defined by claims. Obviously, use in aqueous mud laden fluids includes use in the aqueous phase of an emulsion or mixture with non-aqueous material. It is understood the invention is not to be limited to the specific details described. For example, tests with treating and control agents indicate that these celluloses are somewhat inert chemically and that all the normal and usual treating and control agents of the well-drilling fluid and well controlling fluid arts may, after a simple test for lack of obvious adverse reactions, be employed without invention in our cellulose drilling and controlling fluids, and that with few, if any, exceptions, they will be so employable. Our invention is therefore, to be defined by the following claims.

Having fully described our invention, we claim:

1. In a process for drilling a well with well drilling tools wherein there is circulated in the well a water base drilling mud containing colloidal particles of clayey material suspended in sufficient water to render the same circulatable, the method of forming a filter cake on the wall of said well to decrease the loss of fluid from said drilling mud contained therein into surrounding earthen formations which comprises admixing with said drilling mud and interacting therewith a water soluble cellulose sulfate compound selected from the group consisting of water soluble cellulose acid sulfate and the water soluble metal and ammonium salts of cellulose acid sulfate in an amount sufficient to lower the fluid loss through said filter cake but insufficient to increase the viscosity of said mud to such an extent as to render said drilling mud uncirculatable and contacting said wall of said well with the resulting drilling mud to form said filter cake thereon.

2. In a process for drilling a well with well drilling tools wherein there is circulated in the well a water base drilling mud containing colloidal particles of clayey material suspended in sufficient water to render the same circulatable, the method of forming a filter cake on the wall of said well to decrease the loss of fluid from said drilling mud contained therein into surrounding earthen formations which comprises admixing with said drilling mud and interacting therewith a water soluble cellulose sulfate in an amount sufficient to lower the fluid loss through said filter cake but insufficient to increase the viscosity of said mud to such an extent as to render said drilling mud uncirculatable and contacting said wall of said well with the resulting drilling mud to form said filter cake thereon.

3. In a process for drilling a well with well drilling tools wherein there is circulated in the well a water base drilling mud containing colloidal particles of clayey material suspended in sufficient water to render the same circulatable, the method of forming a filter cake on the wall of said well to decrease the loss of fluid from said drilling mud contained therein into surrounding earthen formations which comprises admixing with said drilling mud and interacting therewith a water soluble calcium cellulose sulfate in an amount sufficient to lower the fluid loss through said filter cake but insufficient to increase the viscosity of said mud to such an extent as to render said drilling mud uncirculatable and contacting said wall of said well with the resulting drilling mud to form said filter cake thereon.

4. In a process for drilling a well with well drilling tools wherein there is circulated in the well a water base drilling mud containing colloidal particles of clayey material suspended in sufficient water to render the same circulatable, the method of forming a filter cake on the wall of said well to decrease the loss of fluid from said drilling mud contained therein into surrounding earthen formations which comprises admixing with said drilling mud and interacting therewith a water soluble ammonium cellulose sulfate in an amount sufficient to lower the fluid loss through said filter cake but insufficient to increase the viscosity of said mud to such an extent as to render said drilling mud uncirculatable and contacting said wall of said well with the resulting drilling mud to form said filter cake thereon.

5. A water base well drilling mud comprising in combination sufficient water to maintain the mud as a fluid, sufficient clayey material to form a filter cake on the wall of the well, and a water soluble cellulose sulfate compound selected from the group consisting of water soluble cellulose acid sulfate and the water soluble metal and ammonium salts of cellulose acid sulfate in an amount sufficient to reduce the water loss due to filtration through said filter cake but insufficient to increase the viscosity of said drilling mud to such an extent that it cannot be circulated.

6. A water base well drilling mud comprising in combination sufficient water to maintain the mud as a fluid, sufficient clayey material to form a filter cake on the wall of the well, and a water soluble sodium cellulose sulfate in an amount sufficient to reduce the water loss due to filtration through said filter cake without increasing the viscosity of said well drilling mud that it cannot be circulated .

7. A water base well drilling mud comprising in combination sufficient water to maintain the mud as a fluid, sufficient clayey material to form a filter cake on the wall of the well, and a water soluble calcium cellulose sulfate in an amount sufficient to reduce the water loss due to filtration through said filter cake without increasing the viscosity of said well drilling mud that it cannot be circulated.

8. A water base well drilling mud comprising in combination sufficient water to maintain the mud as a fluid, sufficient clayey material to form a filter cake on the wall of the well, and a water soluble ammonium cellulose sulfate in an amount sufficient to reduce the water loss due to filtration through said filter cake without increasing the viscosity of said well drilling mud that it cannot be circulated.

9. A water base well drilling mud comprising an aqueous fluid mixture containing suspended solids which form a filter cake on the wall of the well, and a water soluble cellulose sulfate compound selected from the group consisting of water soluble cellulose acid sulfate and the water soluble metal and ammonium salts of cellulose acid sulfate in an amount sufficient to reduce the water loss due to filtration through said filter cake without increasing the viscosity of the said well drilling mud to such an extent that it cannot be circulated.

10. A water base well drilling mud comprising an aqueous fluid mixture containing suspended solids which form a filter cake on the wall of the well, and a water soluble sodium cellulose sulfate in an amount sufficient to reduce the water loss due to filtration through said filter cake without increasing the viscosity of the said well drilling mud to such an extent that it cannot be circulated.

11. A water base well drilling mud comprising an aqueous fluid mixture containing suspended solids which form a filter cake on the wall of the well, and a water soluble calcium cellulose sulfate in an amount sufficient to reduce the water loss due to filtration through said filter cake without increasing the viscosity of the said well drilling mud to such an extent that it cannot be circulated.

12. A water base well drilling mud comprising an aqueous fluid mixture containing suspended solids which form a filter cake on the wall of the well, and a water soluble ammonium cellulose sulfate in an amount sufficient to reduce the water loss due to filtration through said filter cake without increasing the viscosity of the said well drilling mud to such an extent that it cannot be circulated.

13. A water base well drilling mud comprising in combination sufficient water to maintain the mud as a fluid, sufficient clayey material to form a filter cake on the wall of the well, and a water soluble potassium cellulose sulfate in an amount sufficient to reduce the water loss due to filtration through said filter cake without increasing the viscosity of said well drilling mud that it cannot be circulated.

14. A water base well drilling mud comprising in combination sufficient water to maintain the mud as a fluid, sufficient clayey material to form a filter cake on the wall of the well, and a water soluble barium cellulose sulfate in an amount sufficient to reduce the water loss due to filtration through said filter cake without increasing the viscosity of said well drilling mud that it cannot be circulated.

15. A water base well drilling mud comprising an aqueous fluid mixture containing suspended solids which form a filter cake on the wall of the well, and a water soluble potassium cellulose sulfate in an amount sufficient to reduce the water loss due to filtration through said filter cake without increasing the viscosity of the said well drilling mud to such an extent that it cannot be circulated.

16. A water base well drilling mud comprising an aqueous fluid mixture containing suspended solids which form a filter cake on the wall of the well, and a water soluble barium cellulose sulfate in an amount sufficient to reduce the water loss due to filtration through said filter cake without increasing the viscosity of the said well drilling mud to such an extent that it cannot be circulated.

17. In a process for drilling a well drilling tools wherein there is circulated in the well a water base drilling mud containing colloidal particles of clayey material suspended in sufficient water to render the same circulatable, the method of forming a filter cake on the wall of said well to decrease the loss of fluid from said drilling mud contained therein into surrounding earthen formations which comprises admixing with said drilling mud and interacting therewith a water soluble barium cellulose sulfate in an amount sufficient to lower the fluid loss through said filter cake but insufficient to increase the viscosity of said mud to such an extent as to render said drilling mud uncirculatable and contacting said wall of said well with the resulting drilling mud to form said filter cake thereon.

18. In a process for drilling a well with well drilling tools wherein there is circulated in the well a water base drilling mud containing colloidal particles of clayey material suspended in sufficient water to render the same circulatable, the method of forming a filter cake on the wall of said well to decrease the loss of fluid from said drilling mud contained therein into surrounding earthen formations which comprises admixing with said drilling mud and interacting therewith a water soluble potassium cellulose sulfate in an amount sufficient to lower the fluid loss through said filter cake but insufficient to increase the viscosity of said mud to such an extent as to render said drilling mud uncirculatable and contacting said wall of said well with the resulting drilling mud to form said filter cake thereon.

19. In a process for drilling a well with well drilling tools wherein there is circulated in the well a water base drilling mud containing particles of solid material which form a filter cake on the wall of a well and which are suspended in sufficient water to render the same circulatable, the method of forming a filter cake on the wall of said well to decrease the loss of fluid from said drilling mud contained therein into surrounding earthen formations which comprises admixing with said drilling mud and interacting therewith a water soluble cellulose sulfate compound selected from the group consisting of water soluble cellulose acid sulfate and the water soluble metal and ammonium salts of cellulose acid sulfate in an amount sufficient to lower the fluid loss through said filter cake but insufficient to increase the viscosity of said mud to such an extent as to render said drilling mud uncirculatable and contacting said wall of said well with the resulting drilling mud to form said filter cake thereon.

20. The process of claim 19 wherein said cellulose sulfate compound is a water soluble calcium cellulose sulfate.

21. The process of claim 19 wherein said cellulose sulfate compound is a water soluble sodium cellulose sulfate.

22. The process of claim 19 wherein said cellulose sulfate compound is a water soluble ammonium cellulose sulfate.

23. The process of claim 19 wherein said cellulose sulfate compound is potassium cellulose sulfate.

24. The process of claim 19 wherein said cellulose sulfate compound is barium cellulose sulfate.

CARY R. WAGNER.
WILLIAM N. AXE.
CHESTER M. HIMEL.

REFERENCES CITED

The following references are of record in the file of this patent:

UNITED STATES PATENTS

| Number | Name | Date |
| --- | --- | --- |
| 1,082,490 | Berl | Dec. 30, 1913 |
| 1,848,524 | Hagedorn et al. | Mar. 8, 1932 |
| 2,025,073 | Rigby | Dec. 24, 1935 |
| 2,129,913 | Cross et al. | Sept. 13, 1938 |
| 2,336,171 | Freeland et al. | Dec. 7, 1943 |
| 2,337,296 | Kennedy et al. | Dec. 21, 1943 |
| 2,364,434 | Foster | Dec. 5, 1944 |
| 2,425,768 | Wagner | Aug. 19, 1947 |

Certificate of Correction

Patent No. 2,560,611                                                    July 17, 1951

CARY R. WAGNER ET AL.

It is hereby certified that error appears in the printed specification of the above numbered patent requiring correction as follows:

Column 8, line 11, after "soluble" insert *sodium*;

and that the said Letters Patent should be read as corrected above, so that the same may conform to the record of the case in the Patent Office.

Signed and sealed this 26th day of February, A. D. 1952.

[SEAL]

THOMAS F. MURPHY,
*Assistant Commissioner of Patents.*